Sept. 3, 1957 D. K. ROBINSON 2,804,699
EDUCATIONAL DEVICE FOR DECIMAL NUMERATION
Filed Dec. 18, 1953
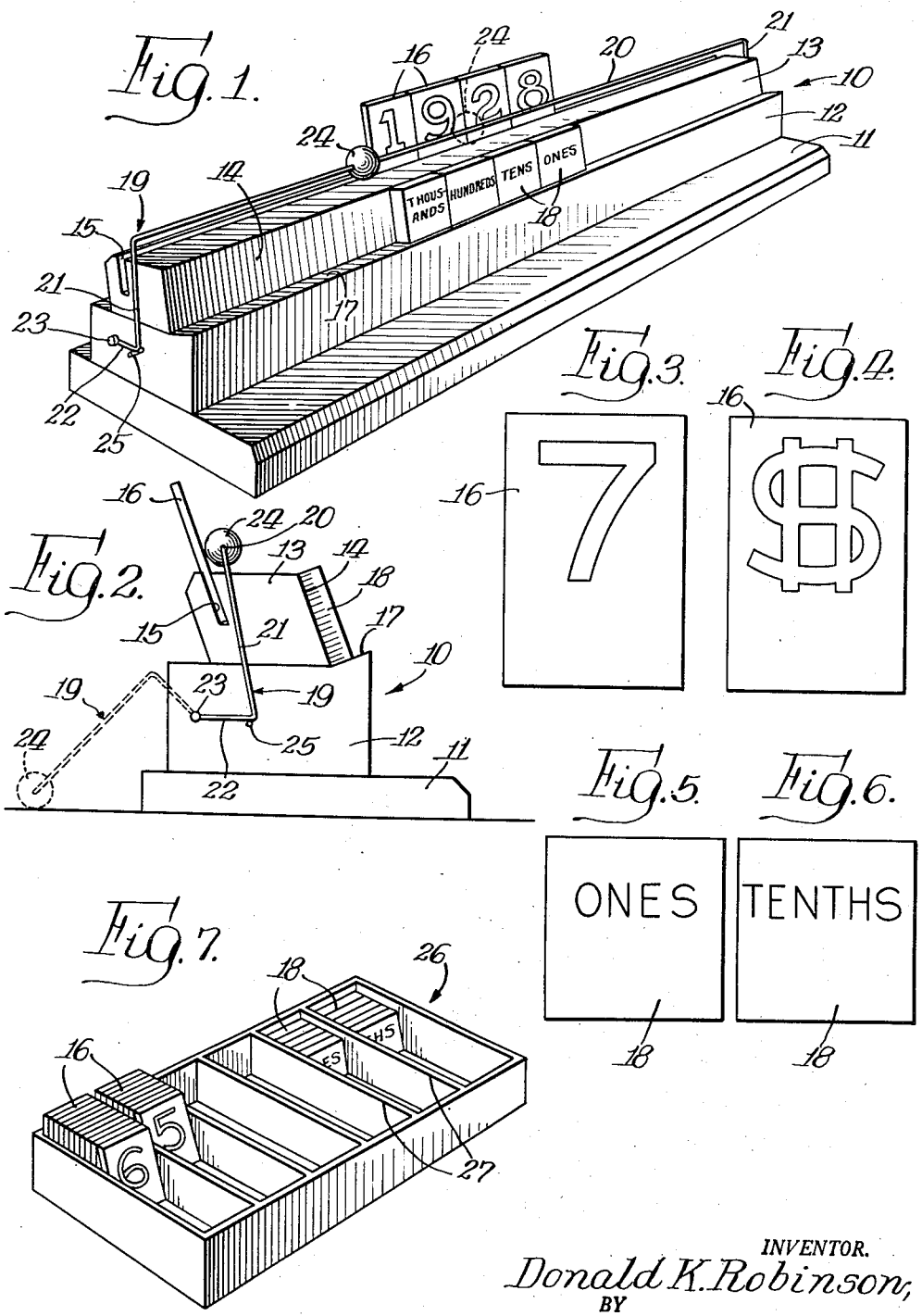
INVENTOR.
Donald K. Robinson,
BY
Davis, Lindsey, Hibben & Noyes Attys.

United States Patent Office 2,804,699
Patented Sept. 3, 1957

2,804,699

EDUCATIONAL DEVICE FOR DECIMAL NUMERATION

Donald K. Robinson, Jacksonville, Ill.

Application December 18, 1953, Serial No. 398,996

8 Claims. (Cl. 35—31)

This invention relates to a novel educational device which is useful as an aid in teaching arithmetic and the number system, particularly to young children.

In teaching the Arabic number system to children at the primary grade level, mechanical contrivances and work books of various types are frequently used. However, such teaching aids as have been known heretofore have not been entirely satisfactory in connection with certain phases of the teaching process. For example, the use and significance of the decimal point and its relationship to the various place value columns are often difficult concepts for young children to grasp. I have found that there is a very definite need for a simple and effective device which can illustrate these points with clarity and visual appeal.

Accordingly, a primary object of my invention is to provide a novel educational device useful in teaching arithmetic and the number system.

A further object of the invention is to provide a novel mechanical teaching aid which is especially adapted for use in introducing the decimal point concept and teaching its significance to young children.

Another object of the invention is to provide an education device of the character described which is particularly useful in teaching the relationship of the decimal point with the ones place value column.

Still another object of the invention is to provide a novel visual aid in the teaching of the number system which particularly enables students to appreciate the fact that the decimal point never leaves an arithmetic problem but merely changes in position in accordance with changes in the value of the number.

Other objects and advantages of the invention will become evident from the subsequent detailed description taken in conjunction with the accompanying drawing, wherein:

Fig. 1 is a perspective view of an educational device comprising one specific embodiment of my invention;

Fig. 2 is an end elevational view of the device shown in Fig. 1;

Figs. 3 to 6 are front elevational views of certain elements used with the device; and Fig. 7 is a perspective view of a tray or a container for the elements shown in Figs. 3 to 6.

Referring to the drawing, the device has an elongated base structure 10 which in this instance is formed from three elongated sections of wood or the like which are secured together, as by gluing, in superimposed relation. Thus, the base structure 10 has a flat relatively wide bottom portion 11 providing a firm support for the device, an intermediate portion 12 of lesser width, and an uppermost portion 13 which is still narrower. Of course, it will be understood that materials other than wood can be employed to form the base structure 10 and that it can be made as an integral unit rather than by the multiple part construction illustrated herein.

The uppermost base portion or element 13 has its front wall, indicated at 14, slanted or inclined rearwardly to a slight extent as best seen in Fig. 2. The upper surface of the element 13 is provided with an elongated slot 15 which extends the full length of the base and is also inclined or slanted rearwardly in generally parallel relation with the slanted front wall 14. As seen in the drawing, the slot 15 is preferably located adjacent the rear longitudinal edge of the element 13. A plurality of small rectangular plates or indicating blocks 16 are provided and each such block bears the indicia of an appropriate digit, such as seen in Fig. 3, or other useful indicia, such as the dollar sign shown in Fig. 4. The thickness and size of the digit blocks 16 are such that the blocks can be slidably disposed in the slot 15 and thereby retained in generally upright but slightly inclined display position. As seen in Fig. 1, a plurality of such digit blocks 16 are arranged in the slot 15 to form the number "1928". Obviously, the teacher can easily slide the digit blocks 16 back and forth in the slot 15 to provide any desired display arrangement.

The front portion of the intermediate base element 12 projects outwardly from the upper base element 13 so as to provide an elongated shoulder portion or recess at the front of the device, this recess being formed by the rearwardly inclined front wall 14 of the element 13 and also by the forwardly projecting upper surface of the element 12 which constitutes a shallow ledge or shelf 17. This ledge or shelf 17 is preferably tapered or inclined upwardly to a slight degree, as clearly shown in Fig. 2. A plurality of smaller rectangular blocks 18 are also provided, these blocks bearing place value indicia as seen in Figs. 5 and 6. Thus, the blocks 18 constitute place value indicators each containing the name of a place value column such as ones, tens, hundreds, thousands, etc. for the whole numbers and tenths, hundredths, thousandths, etc. for the decimal fractions. As seen in Figs. 1 and 2, the appropriate place value indicator blocks 18 are disposed in the elongated recess at the front of the device and below the corresponding digit blocks 16. The place value blocks 18 are slidable in this recess with the bottom edges of the blocks seating on the upwardly inclined ledge 17 and the rear faces of the blocks engaging the inclined front wall 14. It will be understood that the inclined or slanted relation of the surfaces 14 and 17 serves to retain the place value blocks 18 in relatively secure display position while at the same time permitting their convenient shifting or removal. As illustrated in Fig. 1, the place value blocks bearing the indicia "thousands," "hundreds," "tens," and "ones" are placed under the digit blocks "1," "9," "2," and "8," respectively, in order to indicate the significance of the different digit columns.

An elongated swingable bail, indicated generally at 19, is pivotally connected at its ends to the opposite end portions of the base structure 10 for supporting a movable decimal point-representing element. In the form illustrated, the bail 19 consists of a one-piece wire or rod having bent end portions so as to provide an elongated central or cross portion 20, depending leg portions 21, and rearwardly bent end portions 22 disposed at an angle to the leg portions 21. The end portions 22 are swingably mounted on a pair of pivots 23 extending from the opposite ends of the base element 12 so that the entire bail 19 is swingable about the pivots 23 both forwardly and rearwardly of the base structure. A spherical element or bead 24 is slidably carried on the bail portion 20 for representing a decimal point. In normal use of the device, the bail is retained in its forwardly pivoted position, as indicated in Fig. 1 and in full lines in Fig. 2, by means of a pair of retainer pins 25 projecting from the ends of the base element 12 and engaging the angular end portions 22 of the bail. In this position, the elongated cross portion 20 of the bail and the bead 24 carried thereon are positioned forwardly of the slot 15 so that the bead 24 can be located in any desired position in front of the digit blocks 16. However, in the event that the decimal point is not needed or is not desired at any particular time, the entire bail 19 can be pivoted rearwardly of the base structure 10 to a completely concealed position at the rear of the device as indicated in dotted lines in Fig. 2. Consequently, the teacher can avoid confusion by keeping the decimal point element completely out of sight until it is needed.

In Fig. 7 I have shown a rectangular box or tray 26 divided into a plurality of compartments by partitions 27. Thus, the digit blocks 16 and the place value indicator blocks 18 can be conveniently stored and kept available for use in conjunction with the teaching device.

As will be evident from the foregoing description, the device is particularly useful in teaching the significance of the decimal point with particular emphasis on the relationship of the decimal point to the ones place value column. As the teacher demonstrates a problem, the student is readily impressed by the fact that the decimal point, as represented by the bead 24, never leaves the problem but in fact merely moves back and forth as the value of the number represented by the digit blocks 16 is changed or as numbers of varying value are set up in the slot 15. By means of the location of appropriate place value indicator blocks 18 below the respective digit block 16, the student can readily see the relative position of all place value columns from their point of reference, namely, the ones place value column. By the structural arrangement shown, all three factors are visible at the same time, i. e. the digit blocks, the place value indicators disposed therebelow, and the movable decimal point disposed in front of the digit blocks.

As will also be evident, the teaching method may be varied by having the student set up a required combination of digits in the slot 15 after the place value indicators 18 are already in position, or the reverse procedure can be employed by having the student set up appropriate place value indicator blocks to correspond to a predetermined arrangement of digit blocks in the slot 15.

An important advantage of the device resides in the hinged or swingable relationship of the decimal point structure to the rest of the device. If the decimal point concept is not needed or proves to be confusing to young students, it can be completely cleared from normal view by swinging the bail to the rear of the unit.

In addition to the normal use of the device as a teaching aid in the general manner hereinbefore described, it also lends itself readily to related educational uses such as simple games and coordinated use in conjunction with work books and the like.

Although the invention has been described with particular reference to a specific structural embodiment thereof, it is to be understood that various modifications and equivalent structures may be resorted to without departing from the scope of the invention as defined in the appended claims.

I claim:

1. An educational device useful in teaching the number system comprising an elongated body having a slot extending along its upper side, a plurality of digit blocks adapted to be removably and slidably disposed in generally upright display position in said slot, an elongated rod extending longitudinally of said body in front of said slot, a decimal point-representing element slidably disposed on said rod, and means supporting said rod on said body for swinging movement about a pivot axis spaced from but parallel to said rod, said rod being swingable about said axis between a position in front of said slot and said blocks for providing decimal point representation and another position remote from said slot and said blocks when decimal representation is not desired.

2. An educational device useful in teaching the number system comprising an elongated body having a slot extending along its upper side, a plurality of digit blocks adapted to be removably and slidably disposed in generally upright display position in said slot, an elongated support pivotally mounted on said body for swinging movement about a pivot axis parallel to but spaced from the longitudinal axis of said support, said support in one position thereof being adapted to extend in front of said slot, and a decimal point element slidable along said support for providing decimal point representation in said one position of said support, said support being swingable to another position remote from said slot and said digit blocks when the decimal point representation is not desired.

3. An educational device useful in teaching the number system comprising an elongated body having a slot extending along its upper side, a plurality of digit blocks adapted to be removably and slidably disposed in generally upright display position in said slot, a swingable bail pivotally secured at its end portions to the opposite ends of said body, said bail having an elongated cross portion adapted to extend in front of said slot when the bail is in forwardly pivoted position, means for supporting said bail in said forwardly pivoted position, and a decimal point element slidably carried on the cross portion of said bail and adapted to be located in any desired position thereon relative to the digit blocks, said bail being swingable rearwardly of said body for shifting the decimal point element out of view and away from said digit blocks.

4. The device of claim 3 further characterized in that the end legs of said bail have angularly-extending portions pivoted at their end extremities to said body, and said means comprises abutment members projecting from the ends of said body and engaging said angularly-extending portions for supporting the cross portion of the bail horizontally in front of said digit blocks.

5. An educational device useful in teaching the number system comprising an elongated base structure, a plurality of digit indicating blocks, a plurality of place value indicating blocks, means comprising a longitudinal slot at the upper portion of said base structure for supporting the digit indicating blocks in generally upright display position and in slidable relation therealong, an elongated outwardly projecting ledge at the front of said base structure for slidably supporting the place value indicating blocks in generally upright display position below the digit indicating blocks, an elongated support extending across the upper portion of said base structure between said slot and said ledge, and a decimal point-representing element slidably mounted on said support for movement therealong in front of the digit indicating blocks.

6. An educational device useful in teaching the number system comprising an elongated base structure having a longitudinal slot in its upper surface, said slot being inclined slightly to the rear of the device, a plurality of digit blocks adapted to be slidably supported in said slot in generally upright but rearwardly inclined display position, an elongated shoulder at the front of said base structure below the upper surface thereof, said shoulder having a bottom ledge portion extending forwardly and inclined slightly upwardly and the front portion of said base structure above said ledge portion being inclined slightly to the rear in generally parallel relation with said slot, a plurality of place value blocks adapted to be slidably supported in rearwardly inclined display position on said shoulder below the digit blocks with the bottom edges of the place value blocks engaging said ledge portion and the rear faces of the place value blocks engaging the rearwardly inclined front portion of said base structure, an elongated supporting member extending along said base structure adjacent the upper surface thereof and in front of said slot, and a decimal point-representing element slidably mounted on said supporting member in front of the digit blocks.

7. The device of claim 6 further characterized in that said supporting member is pivotally connected to said base structure and is adapted to be swung rearwardly for removing the decimal point-representing element from normal view.

8. The device of claim 1 further characterized in that said body is provided at the front side thereof with an elongated outwardly projecting ledge for slidably supporting a plurality of place value indicating blocks in generally upright display relation below the digit indicating blocks.

References Cited in the file of this patent

UNITED STATES PATENTS

| | | |
|---|---|---|
| 480,164 | Barrett | Aug. 2, 1892 |
| 1,327,775 | Platt | Jan. 13, 1920 |
| 1,863,927 | Konno | June 21, 1932 |
| 2,457,332 | Wade et al. | Dec. 28, 1948 |
| 2,527,080 | Rickard et al. | Oct. 24, 1950 |

FOREIGN PATENTS

| | | |
|---|---|---|
| 122,089 | Switzerland | Oct. 28, 1926 |
| 587,220 | Great Britain | Apr. 17, 1947 |